(12) United States Patent
Massey

(10) Patent No.: US 7,196,910 B2
(45) Date of Patent: Mar. 27, 2007

(54) ROUTING AND LABELING SYSTEM FOR WIRES, CABLES, FIBERS AND THE LIKE

(76) Inventor: Mike L. Massey, 303 Corporate Dr., Midland, TX (US) 79705

( * ) Notice: Subject to any disclaimer, the term of this patent is extended or adjusted under 35 U.S.C. 154(b) by 315 days.

(21) Appl. No.: 10/781,496

(22) Filed: Feb. 17, 2004

(65) Prior Publication Data
US 2004/0160755 A1 Aug. 19, 2004

Related U.S. Application Data

(62) Division of application No. 10/136,151, filed on May 1, 2002, now Pat. No. 6,983,046.

(51) Int. Cl.
*H01R 9/00* (2006.01)
(52) U.S. Cl. ...................... 361/823; 399/326
(58) Field of Classification Search ..................... None
See application file for complete search history.

(56) References Cited

U.S. PATENT DOCUMENTS 3,905,203 A * 9/1975 Jacob ........................ 62/272
5,073,841 A * 12/1991 DelGuidice et al. ........ 361/827
5,124,191 A * 6/1992 Seksaria ..................... 428/178
5,818,730 A * 10/1998 Young ......................... 716/14
7,006,620 B1 * 2/2006 Ekstrom et al. ........ 379/265.03
2003/0097806 A1 * 5/2003 Brown ...................... 52/220.1

* cited by examiner

*Primary Examiner*—Creighton Smith
(74) *Attorney, Agent, or Firm*—Christopher L. Makay

(57) ABSTRACT

An apparatus for routing and mapping a wiring system includes a wire routing system adapted to facilitate the routing of wires about a structure and a wire labeling system that permits labeling of each wire routed utilizing the wire routing system. The wire routing system includes a 2, 3, 4 module, a standard module, and a master module adapted to receive a connection from a communication service provider and output signals received from the communication service provider to any one of or all of the 2, 3, 4 module, the standard module, and end user devices. The apparatus for routing and mapping a wiring system further includes a wire management panel, whereby the wire labeling system attaches to the wire management panel and includes and a room label section, a wall label section, a box number label section, and a plate identifier label section.

40 Claims, 9 Drawing Sheets

Fig. 7

| Label | WALL N S E W | BOX # | LOCATION | | | | |
|---|---|---|---|---|---|---|---|
| Main Office (10b) | WALL (N)S E W | BOX # | ☐ | ☒ | ☐ | ☐☐ | ☐☐ |
| " | WALL (N)S E W | BOX # | ☐ | ☒ | ☐ | ☐☐ | ☐☐ |
| " | WALL (N)S E W | BOX # | ☐ | ☒ | ☐ | ☐☐ | ☐☐ |
| " | WALL (N)S E W | BOX # | ☐ | ☒ | ☐ | ☐☐ | ☐☐ |
| | WALL N S E W | BOX # | ☐ | ☐ | ☐ | ☐☐ | ☐☐ |
| | WALL N S E W | BOX # | ☐ | ☐ | ☐ | ☐☐ | ☐☐ |
| | WALL N S E W | BOX # | ☐ | ☐ | ☐ | ☐☐ | ☐☐ |
| | WALL N S E W | BOX # | ☐ | ☐ | ☐ | ☐☐ | ☐☐ |
| | WALL N S E W | BOX # | ☐ | ☐ | ☐ | ☐☐ | ☐☐ |
| Computer Room (104) | WALL N(S)E W | BOX # | ☒ | ☐ | ☐ | ☐☐ | ☐☐ |
| " | WALL N(S)E W | BOX # | ☒ | ☐ | ☐ | ☐☐ | ☐☐ |
| " | WALL N S(E)W | BOX # | ☒ | ☐ | ☐ | ☐☐ | ☐☐ |
| " | WALL N S E(W) | BOX # | ☒ | ☐ | ☐ | ☐☐ | ☐☐ |
| | WALL N S E W | BOX # | ☐ | ☐ | ☐ | ☐☐ | ☐☐ |
| | WALL N S E W | BOX # | ☐ | ☐ | ☐ | ☐☐ | ☐☐ |
| | WALL N S E W | BOX # | ☐ | ☐ | ☐ | ☐☐ | ☐☐ |
| My Office (Rm 102) | WALL (N)S E W | BOX # | ☐ | ☐ | ☒ | ☐☐ | ☐☐ |
| " | WALL (N)S E W | BOX # | ☐ | ☐ | ☒ | ☐☐ | ☐☐ |
| " | WALL (N)S E W | BOX # | ☐ | ☐ | ☒ | ☐☐ | ☐☐ |
| " | WALL N S(E)W | BOX # | ☒ | ☐ | ☐ | ☐☐ | ☐☐ |
| | WALL N S E W | BOX # | ☐ | ☐ | ☐ | ☐☐ | ☐☐ |
| Office Faxes (110) | WALL (N)S E W | BOX # | ☒ | ☐ | ☐ | ☐☐ | ☐☐ |
| " | WALL N(S)E W | BOX # | ☒ | ☐ | ☐ | ☐☐ | ☐☐ |
| Office Phones (110) | WALL N S(E)W | BOX # | ☒ | ☐ | ☐ | ☐☐ | ☐☐ |
| " | WALL N S E(W) | BOX # | ☒ | ☐ | ☐ | ☐☐ | ☐☐ |
| | WALL N S E W | BOX # | ☐ | ☐ | ☐ | ☐☐ | ☐☐ |
| | WALL N S E W | BOX # | ☐ | ☐ | ☐ | ☐☐ | ☐☐ |
| | WALL N S E W | BOX # | ☐ | ☐ | ☐ | ☐☐ | ☐☐ |
| Boss's TV (MAIN OFFICE) | WALL (N)S E W | BOX # | ☒ | ☐ | ☐ | ☐☐ | ☐☐ |
| My TV (Rm 102) | WALL N(S)E W | BOX # | ☒ | ☐ | ☐ | ☐☐ | ☐☐ |
| Office TV | WALL N(S)E W | BOX # | ☒ | ☐ | ☐ | ☐☐ | ☐☐ |
| Lounge TV | WALL N S E(W) | BOX # | ☒ | ☐ | ☐ | ☐☐ | ☐☐ |
| " | WALL (N)S E W | BOX # | ☐ | ☒ | ☐ | ☐☐ | ☐☐ |
| " | WALL (N)S E W | BOX # | ☐ | ☒ | ☐ | ☐☐ | ☐☐ |
| " | WALL N S(E)W | BOX # | ☒ | ☐ | ☐ | ☐☐ | ☐☐ |
| | WALL N S E W | BOX # | ☐ | ☐ | ☐ | ☐☐ | ☐☐ |
| | WALL N S E W | BOX # | ☐ | ☐ | ☐ | ☐☐ | ☐☐ |
| | WALL N S E W | BOX # | ☐ | ☐ | ☐ | ☐☐ | ☐☐ |
| | WALL N S E W | BOX # | ☐ | ☐ | ☐ | ☐☐ | ☐☐ |

80 — 81 — 82 — 83 TYPE OF PLATE IN ROOM AND JACK LOCATION

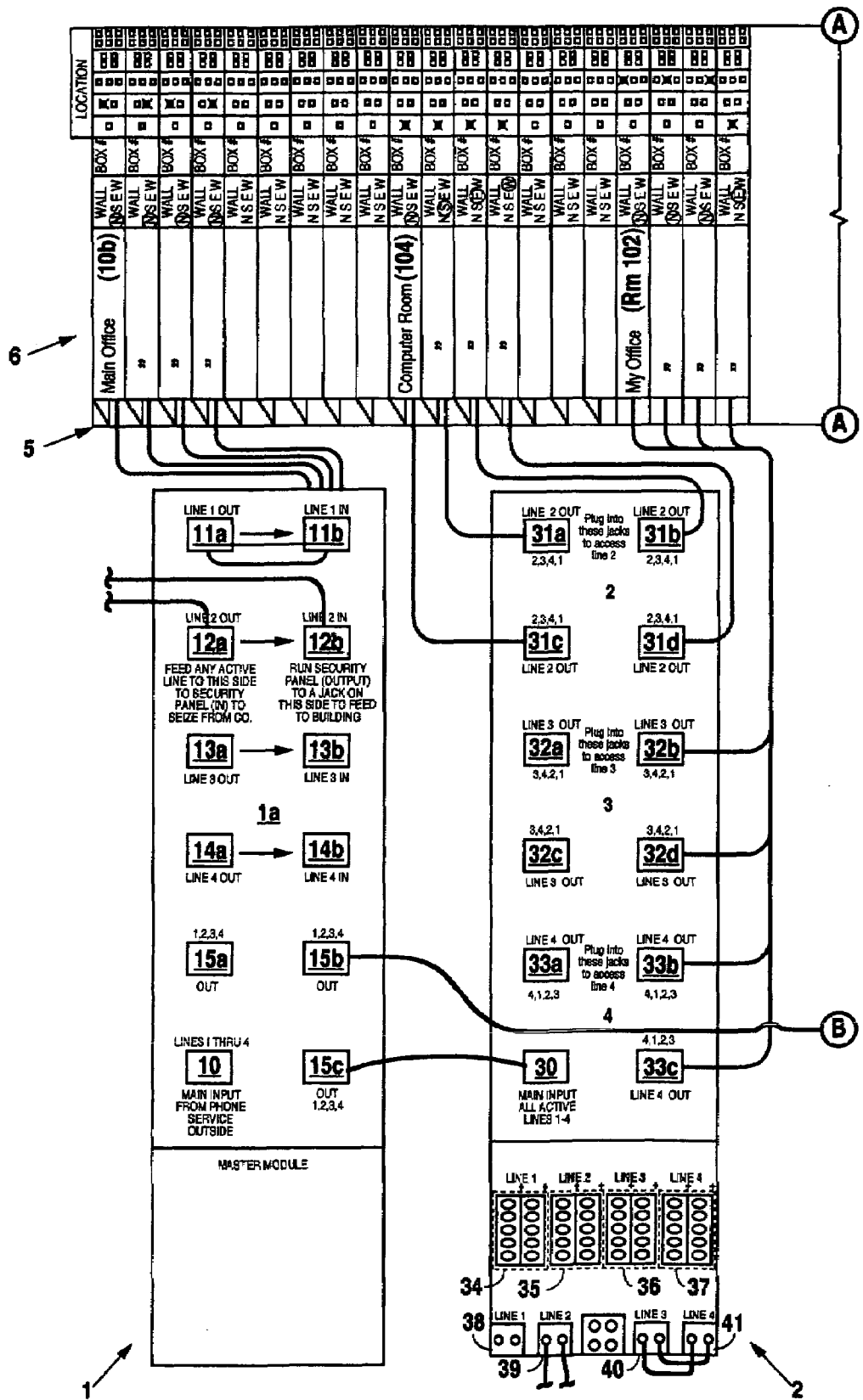
Fig. 7a.1

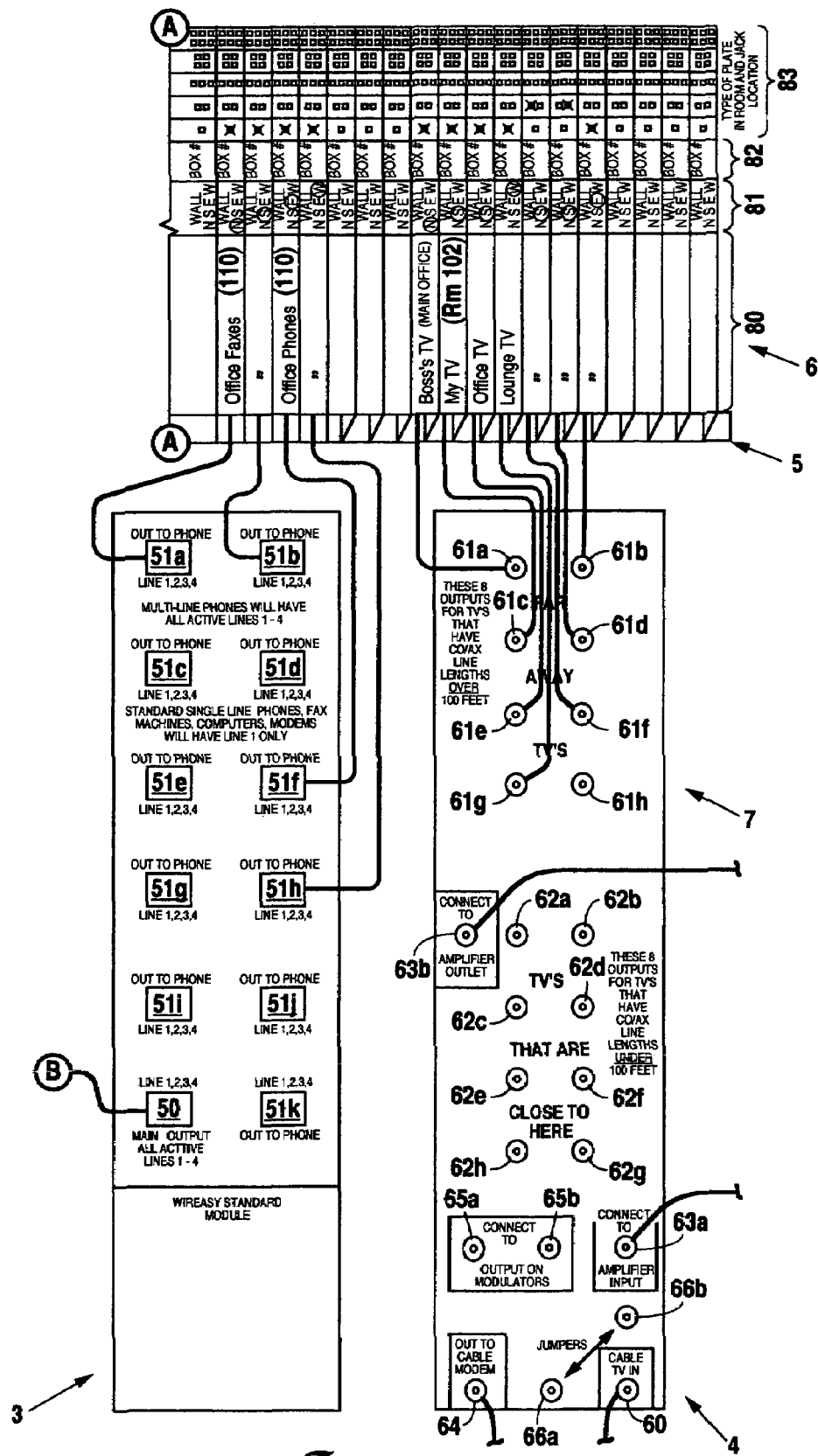
Fig. 7a.2

ROUTING AND LABELING SYSTEM FOR WIRES, CABLES, FIBERS AND THE LIKE

CROSS REFERENCE TO RELATED APPLICATION

This application is a divisional application of application Ser. No. 10/136,151 which was filed on May 1, 2002 now U.S. Pat. No. 6,983,046.

BACKGROUND OF THE INVENTION

1. Field of the Invention

The present invention relates to a method and apparatus for routing and mapping a system of wires, cables, fibers, wall outlets, jacks, receptacles, and the like.

2. Description of the Related Art

Ever since the invention of electricity and electronics, a need for accurately finding, tracing and locating wires, cables, fibers, and the like has existed. Over the years, many methods have developed. Currently, the most common method of labeling wires, cables, fibers, and the like involves individual labeling. Using this method, wires, cables, fibers, and the like that perform a particular function or are of a particular type are externally marked for identification. However, many types of wires, cables, fibers, and the like have exterior surfaces that are either difficult to label due to the insulating material, are too small to label effectively, or use a non-uniform labeling standard. Even when properly labeled, however, most often wires, cables, fibers, and the like are bundled or grouped together using rope, tape, or straps during installation in a structure. This makes tracing an individual wire, cable, fiber, and the like through such a grouping difficult and time consuming, which in turn makes it difficult to find the source or destination of a particular wire, cable, fiber, and the like, even with a wiring diagram.

In the case of new construction, most wires, cables, fibers, and the like are installed and bundled during the framing stage of construction process. The wires, cables, fibers, and the like however cannot be properly tested for faults or damage until they are terminated with proper connectors on each end. Unfortunately, no convenient system for terminating, testing, and labeling each end of the wires, cables, fibers, and the like currently exists that will protect the terminated ends from damage during the wall finish out stage of the construction process (e.g., hanging of sheetrock, application of mud, and painting). The wires, cables, fibers, and the like are therefore normally not terminated, tested, and labeled until completion of the wall finish out stage, at which point it is expensive and time consuming to replace existing wires, cables, fibers, and the like if a problem is discovered. It is certainly less expensive to replace existing wires, cables, fibers, and the like before the wall finish out stage than after the wall finish out stage. Accordingly, a system that provides a convenient way to terminate, test, and label wires, cables, fibers, and the like as well as store them for use after completion of construction would solve the aforementioned problems.

Furthermore, it is common for the stripping, preparation, and terminating of wires, cables, fibers, and the like to be done at the wall outlets and "head-end" after the floors and walls are finished. This involves cleaning dirt and debris from gang boxes and walls, and it is very difficult to do so without dirtying new walls and floors. Accordingly, a system that permits the performance of the above tasks early in the construction phase would eliminate the aforementioned problems.

Another system, found especially in schools and businesses, is a system utilizing hubs to route phone lines, internet lines, cable lines, and the like. The incoming lines from a phone or internet service provider are routed into the back of labeled panels and then routed onto user sources. This system, however, has disadvantages. One such disadvantage is the lack of a method to individually identify and label a source line and its user receptacle together. For example, in an application where several lines are routed to one wall receptacle, or when one line from a panel to a user outlet needs to be rerouted, altered, or needs troubleshooting, the labels and diagrams of the current system only indicate which lines are routed to a particular room. There is currently no easily readable map by which a particular wire can be clearly identified and traced from an input source, such as a line from the phone company, to a user outlet receptacle.

Another disadvantage of this system is when a security or monitoring system is installed, and one or more lines need to be captured or monitored. The installation process involves routing lines of wire into the security system and then routing them back into the phone or internet system. This involves re-routing of the appropriate wires by a technician, which is expensive and can also require troubleshooting at additional cost once the wires have been re-routed.

The hubs or "switchboards" used by this system also lack an easy method to combine, mix, or switch lines routed to a user outlet. More hubs usually must be purchased to combine or mix lines, and to switch individual lines, an expensive technician must be hired to first locate the destination user outlets of each line then physically switch the lines.

Accordingly, a wire mapping system is needed that allows clear identification and association of a line leaving a hub or "switchboard" with a user outlet and the individual receptacle on the outlet. In addition, a wiring system is needed that is easily expandable and adaptable to include the introduction of security systems or monitoring devices. Further, a wiring system is needed that allows easy alteration, rerouting, and combination of lines without additional cost or equipment. Still further, a wiring system is needed that allows for the testing and troubleshooting of wires within the system without the need for an expensive technician or testing equipment.

SUMMARY OF THE INVENTION

In accordance with the present invention, an apparatus for routing and mapping a wiring system includes a wire management panel, a wire routing system adapted to facilitate the routing of wires about a structure, and a wire labeling system that permits labeling of each wire routed utilizing the wire routing system. The wire routing system includes a 2, 3, 4 module, a standard module, and a master module adapted to receive a connection from a communication service provider and output signals received from the communication service provider to any one of or all of the 2, 3, 4 module, the standard module, and end user devices.

The master module includes a main router section and a panel router section. The main router section includes a main input receptacle adapted to receive a connection from a communication service provider and a line out section adapted to receive output line connections. The main router section further includes a line in section adapted to receive input line connections from the line out section. The main router section still further includes a jumper out receptacle adapted to receive from the one or more jumper pin blocks all the incoming lines from the communication service provider. The panel router section includes one or more jumper pin blocks that connect to the main input receptacle and direct one or more incoming lines from the communication service provider to the line out section. The panel router section further includes a secondary input section adapted to receive one or more connections from alternate communication sources.

The 2, 3, 4 module includes a main router section and a panel router section. The main router section includes a main input receptacle adapted to receive a connection from a communication service provider and a line out section adapted to receive output line connections. The main router section further includes a line in section adapted to receive input line connections from the line out section. The panel router section includes one or more jumper pin blocks that connect to the main input receptacle and direct one or more incoming lines from the communication service provider to the line out section. The panel router section further includes a secondary input section adapted to receive one or more connections from alternate communication sources.

The standard module includes a main input receptacle adapted to receive a connection from a communication service provider. The standard module further includes a line out section adapted to receive from the main input receptacle all the incoming lines from the communication service provider. The panel router section further includes a secondary input section adapted to receive one or more connections from alternate communication sources.

The wire management panel includes an outer case and a plurality of parallel spacers running the length of the outer case so as to form parallel veins axially within the outer case. The wire management panel further includes a holding strap secured to one end of the outer case for preventing a loop of wire within a parallel vein from exiting at that end.

The wire labeling system includes a drawing attached to the wire management panel. The drawing depicts a destination label section for denoting the location of a space within the structure and a support structure label section for denoting a location of a support structure within the space denoted by the destination label section. The drawing further depicts an outlet number label section for denoting an assigned number of an outlet and an interface label section for denoting a receptacle on an outlet as denoted by the box number.

It is therefore an object of the present invention to provide a wire routing system that is easily expandable and adaptable to include the introduction of security systems or monitoring devices.

It is another object of the present invention to provide a wire labeling system that allows clear identification and association of a line leaving a hub or "switchboard" with a user outlet and the individual receptacle on the outlet.

It is a further object of the present invention to provide a wire routing system that allows easy alteration, rerouting, and combination of lines without additional cost or equipment.

It is still a further object of the present invention to provide a wire routing system that allows for the testing and troubleshooting of wires within the system without the need for an expensive technician or testing equipment.

Still other objects, features, and advantages of the present invention will become evident to those of ordinary skill in the art in light of the following.

BRIEF DESCRIPTION OF THE DRAWINGS

FIG. 1a is a front plain view illustrating a panel router of the master module.

FIGS. 7, 7a.1, and 7a.2 are an example illustrating the use of the wire management system and the router system.

DETAILED DESCRIPTION OF THE PREFEREED EMBODIMENT

Figure 1:
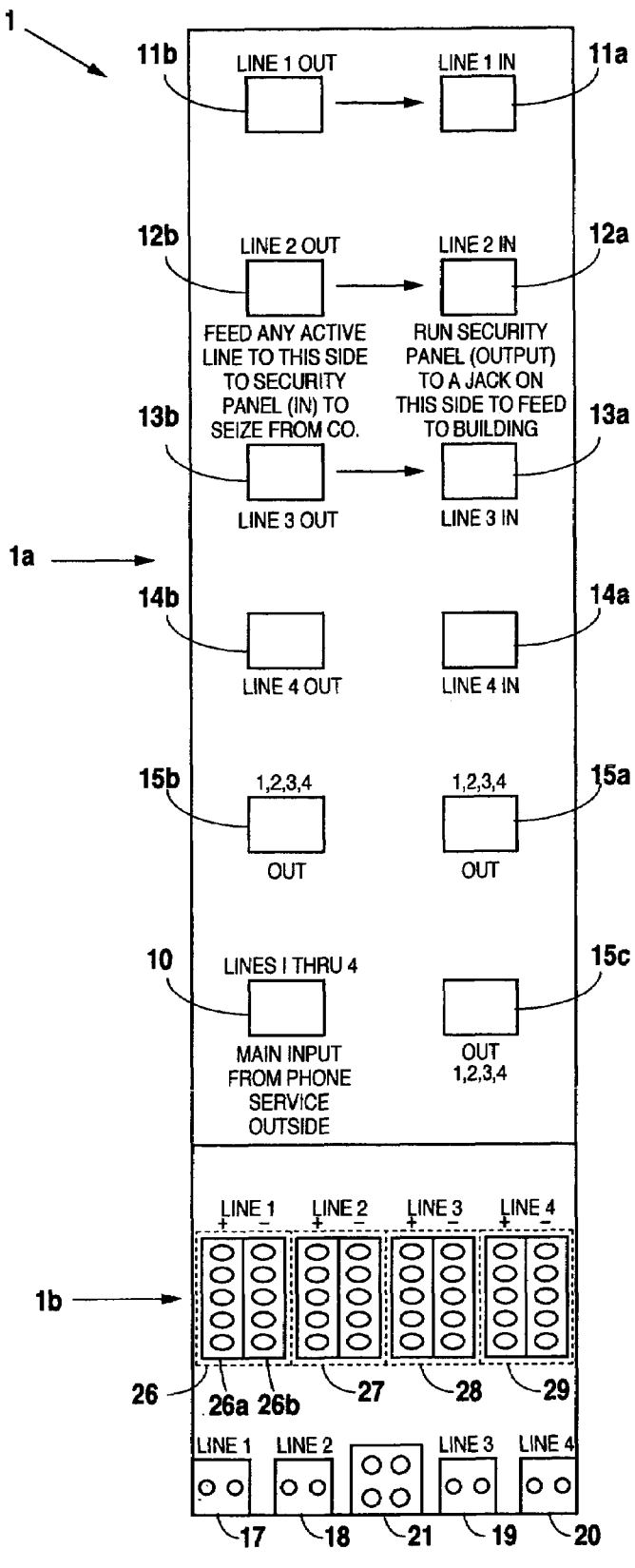
FIGS. 1 and 1a is a front plain views illustrating the master module of a router system.

A method and apparatus for routing and mapping a system of wires includes a wire management panel 5, a wire labeling system 6, and a routing system 7. The routing system includes a master module 1, a 2, 3, 4 module 2, a standard module 3, and a cable module 4.

Figure 1A:
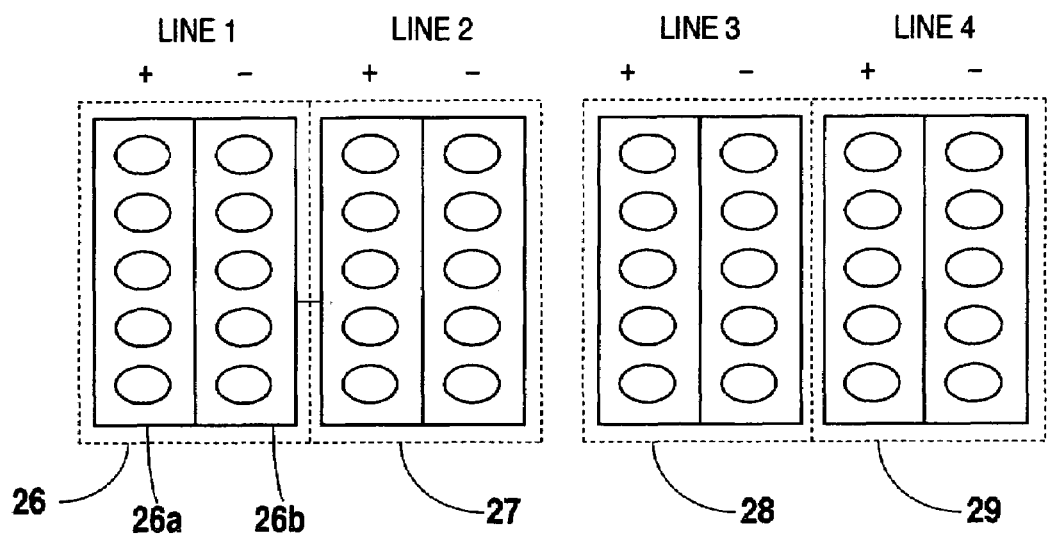
Figure 1A:
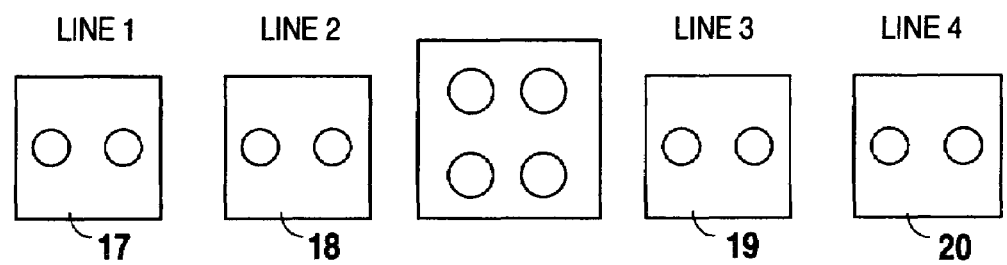

In reference to FIGS. 1 and 1a, the master module 1 includes an upper, main router section 1a and a lower, panel router section 1b. The main router section 1a routes lines to exterior sources and in the preferred embodiment includes a main input receptacle 10, line in receptacles 11a–14a, line out receptacles 11b–14b, and jumper out receptacles 15a–15c. The panel router section 1b routes wires within the module panel to the line out receptacles 11b–14b, and includes jumper pin blocks 26–29 and secondary source terminals 17–20 to receive secondary inputs into the master module 1.

The master module's 1 main input source is the main input receptacle 10, which in the preferred embodiment is an 8-conductor, 4-line phone connection designed to receive an outside line from a phone service provider. However, those of ordinary skill in the art will realize that any number of possible inputs are useable, such as T1, T3 and the like. The outside line (not shown), is an 8-conductor, 4-line connection from a phone service provider, and is secured inside the main input receptacle 10 using any suitable means, such as a flexible tine, a screw fitting, or the like. The 8-conductors consist of the positive and negative wires associated with each of four phone lines. All eight wires from the main input receptacle 10 are routed to jumper pin block 26–29. In the preferred embodiment, the positive and negative wires associated with telephone line one are routed to a jumper pin set 26, while line two is routed to a jumper pin set 27, line three to a jumper pin set 28 and line four to a jumper pin set 29.

Using telephone line one as an example, with lines two through four operating in the same manner, the positive wire from telephone line one is routed from the main input receptacle 10 to a jumper pin selector 26a, and the negative wire from telephone line one is routed from the main input receptacle 10 to a jumper pin selector 26b. In the same manner, positive and negative wires from the line one secondary source terminal 17 are routed to the positive and negative jumper pins of the jumper pin set 26. The line one out receptacle 11b is routed the same way. A power line from an outside power source could also be routed to the positive and negative jumper pins on pin selectors 26a, 26b of pin block 26 depending upon the application. In order to route telephone line one to the line one out receptacle 11*b* an installer simply selects the appropriate pins and makes a connection between them.

In a similar fashion, the line one secondary source terminal 17 can receive a secondary input, such as an intercom line, a long distance internet connection or the like. The secondary source wires are secured to the line one secondary source terminals using any suitable means, such as screw terminals, female receptacles, clips or the like. The positive and negative wires from the line one secondary source terminal are routed to the positive jumper pin selector 26*a* and the negative jumper pin selector 26*b*, respectively. Then, in order to route this secondary source to the line one out receptacle 11*b*, one must simply select the appropriate pins and make a connection between them.

In this manner, one or more lines from the main input receptacle 10 can be routed to not only the corresponding outlet, i.e. line one to the line one out receptacle 11*b*, but also to the other line out receptacle 12*b*–14*b*, the jumper out receptacles 15*a*–15*c*, or not routed anywhere. Secondary input lines from the secondary source terminals 17–20 can also be routed in like manner to any output receptacle or terminal on the main module 1. Those of ordinary skill in the art, however, will realize that the jumper pin blocks 26–29 could be replaced by any manner of selection media, such as dip selector switches and the like, in order to select the routing of the lines within the main module 1.

The main module 1, after the input lines have been routed, can output these lines by means of the line in receptacles 11*b*–14*b* and the jumper out receptacles 15*a*–15*c*. In this embodiment, the line out receptacles 11*b*–14*b* and the line in receptacles 11*a*–14*a* have 2-conductor, 1-line standard phone receptacle connections, while the jumper out receptacles 15*a*–15*c* are designed to receive 8-conductor, 4-line RJ-45 connectors. A standard phone connector is secured into one of the line out receptacles 11*b*–14*b* using any suitable means such as a plastic tine, a clip or the like. The connector on the opposite end of the standard phone line is secured into one of the line in receptacles 11*a*–14*a* or can be routed to a testing device for testing the phone line. The line out receptacles 11*b*–14*b*, in the preferred embodiment, have wires that are routed to user sources. In this way, any line from any of the line out receptacles 11*b*–14*b* can connect to any of the line in receptacles 11*a*–14*a* or be routed elsewhere for use, such as to a security system or to a testing device, which makes it possible to route any of the lines that are input into the main module 1, whether from the main input receptacle 10 or one of the secondary source terminals 17–20, to any of the lines that are routed to user sources, other systems, or other modules.

The jumper out receptacles 15*a*–15*c*, however, can route up to four lines. Depending upon the pin selection, the jumper out receptacle 15*a*–15*c* can route, for example, telephone lines one through four, telephone lines one through three and a secondary source from a secondary source terminal 17–20, or any combination thereof. Also, line one could be routed to all four lines of the jumper out receptacles 15*a*–15*c*. Lines two, three, four or a secondary source can be routed likewise. In this way, any combination of lines can be output from the jumper out receptacles 15*a*–15*c* to another system or module, such as the 2, 3, 4 module or a standard module.

Figure 2:
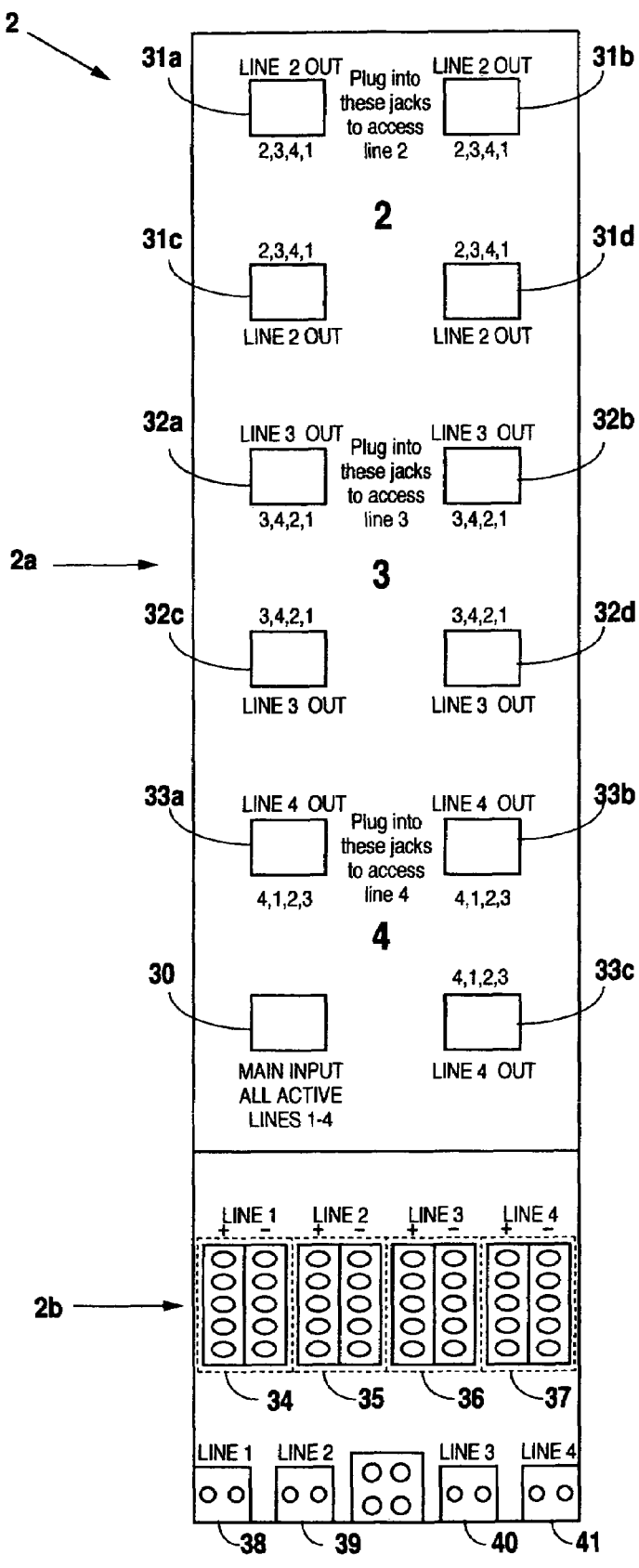
FIG. 2 is a front plain view of the 2, 3, 4 module of a router system.

In reference to FIG. 2, the 2, 3, 4 module 2 includes an upper, main router section 2*a* and a lower, panel router section 2*b*. The main router section 2*a* routes lines to exterior sources and includes a main input receptacle 30 that receives a multiple line input and line out receptacles 31*a*–33*c* that switch the order of output for signals received through the multiple line input. Illustratively, the main input receptacle 30 receives a line 1,2,3,4 input and the line out receptacles 31*a*–33*c* switch the line 1,2,3,4, input to one of a 2,3,4,1 output, a 3,4,2,1 output, and a 4,1,2,3 and output. The panel router section 2*b* routes wires within the module panel, and includes jumper pin blocks 34–37 and secondary source terminals 38–41 to receive secondary inputs into the 2, 3, 4 module 2.

The main input receptacle 30, in the preferred embodiment, is designed to receive an 8-conductor, 4-line RJ-45 connection. The main input receptacle 30 routes wires with the lines from the RJ-45 connection to the jumper pin blocks 34–37. The secondary source terminals 38–41 also have wires routed to the jumper pin blocks 34–37. The operation and construction of the jumper pin blocks 34–37 and the secondary source terminals 38–41 are identical to that as described above on the master module 1 except that no jumper out terminals connect to the jumper pin blocks 34–37.

Figure 3:
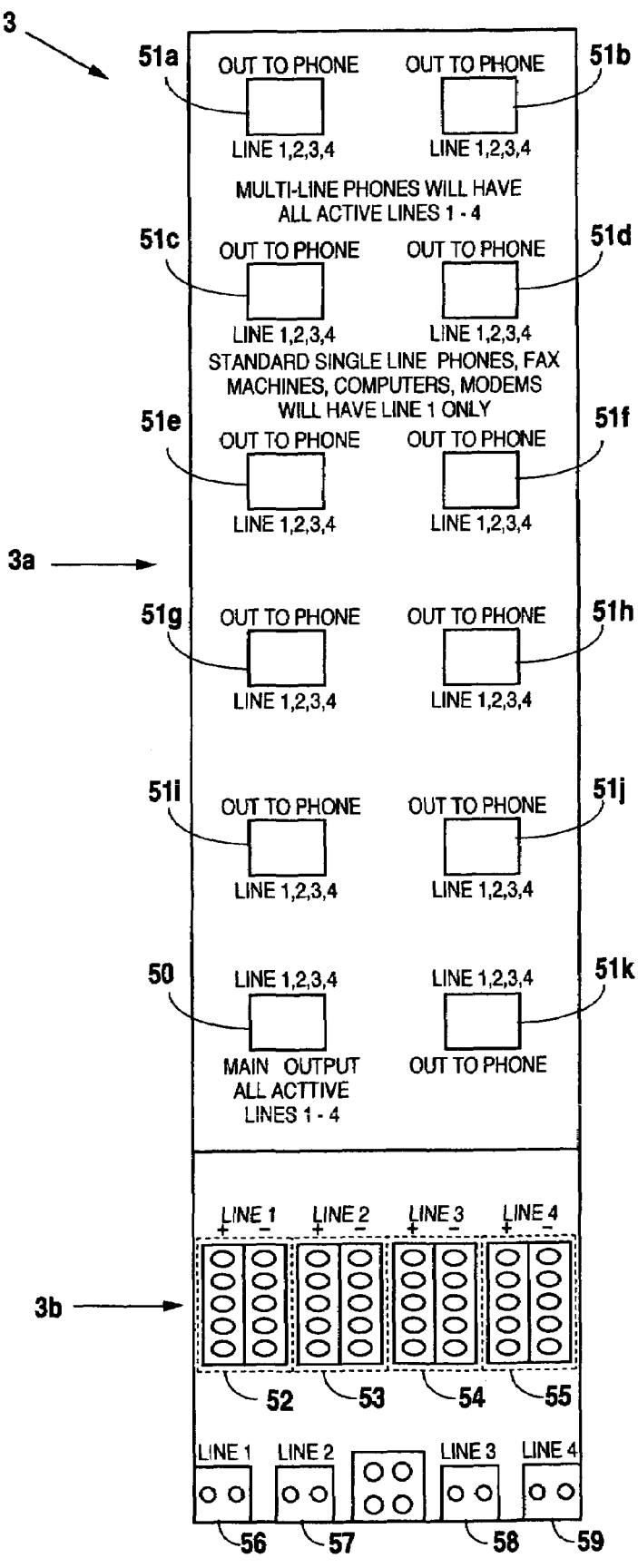
FIG. 3 is a front plain view of the standard module of a router system.

The standard module 3, as illustrated in FIG. 3, includes an upper, main router section 3*a* and a lower, panel router section 3*b*. The main router section 3*a* routes lines to exterior sources and includes a main input receptacle 50 and line out receptacles 51*a*–51*k*. The panel router section 3*b* routes wires within the module panel, and includes jumper pin blocks 52–55 and secondary source terminals 56–59 to receive secondary inputs into to the standard module 3.

The main input receptacle 50 of the standard module 3 is designed, in the preferred embodiment, to receive an 8-conductor, 4-line RJ-45 connection. The main input receptacle 50 routes wires carrying the lines from the RJ-45 connection to the jumper pin blocks 52–55. The secondary source terminals 56–59 also have wires routed to the jumper pin blocks 52–55. All four lines from the jumper pin blocks 52–55 are routed to each of the line out receptacles 51*a*–51*k*. Otherwise, the function of the jumper pin blocks 52–55 is identical to that as described above on the main module 1.

The line out receptacles 51*a*–51*k*, in the preferred embodiment, are designed to receive 8-conductor, 4-line RJ-45 connectors for use by multi-line phones. However, if desired, a power supply can be routed through the system using an outside power source. Using line four as an example, an outside power source is connected to the line four secondary source terminal 59. The wires from the line four secondary source terminal 59, which are routed to the line 4 jumper pin block 55, energize the appropriate positive and negative pins. The energized pins on the line four jumper pin block 55 are then connected, using any suitable means such as clips, screw terminals, or the like, to the appropriate pins for line four on the line four jumper pin block 55. The line four wires are then energized to all the lines and are ready to receive standard 8-conductor, 4-line RJ-45 connectors and be routed to user devices. Although line four on the standard module 3 is shown here, those of ordinary skill in the art will recognize that all or none of the lines could be energized on any of the modules, and that the aforementioned is merely one example on one module.

Figure 4:
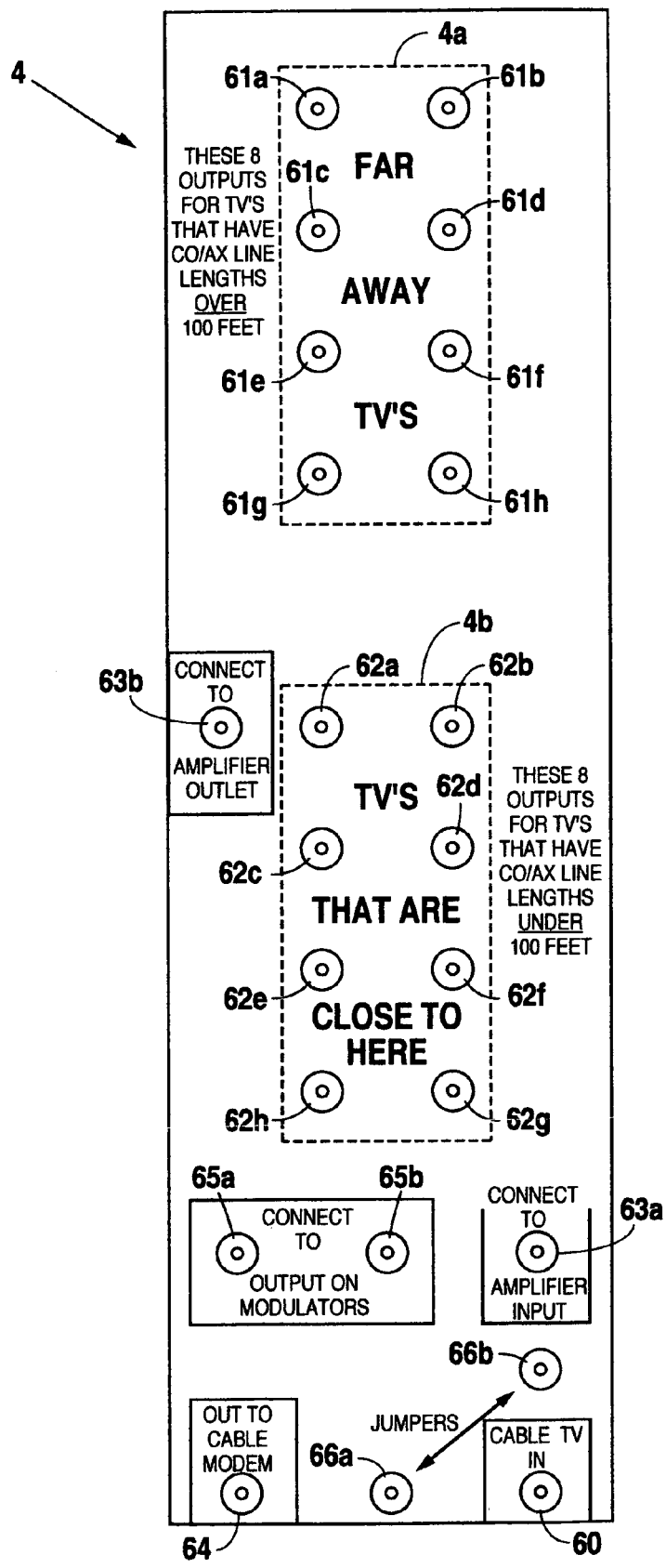
FIG. 4 is a front plain view of a cable module.

Coaxial cable may also be routed via a cable module 4, as seen in FIG. 4. In the preferred embodiment, the cable module 4 includes an upper amplified output section 4*a*, and a lower amplified output section 4*b*. The upper amplified output section 4*a* includes amplified cable outlet receptacles 61*a*–61*h* and the lower amplified output section 4*b* includes amplified cable outlet receptacles 62*a*–62*h*. The cable module 4 also includes a main input receptacle 60, an outlet to amplifier input receptacle 63*a*, an inlet from amplifier receptacle 63b, two modulator outlet receptacles 65a, 65b, two jumper receptacles 66a, 66b and a cable modem outlet receptacle 64.

In the preferred embodiment, the main input receptacle 60 is designed to receive an outside line that is a standard coaxial cable connection, which is provided by any suitable cable or internet service provider. Wires from the main input receptacle 60 route the outside line to the amplifier input receptacle 63a, the cable modem outlet receptacle 64, and the two modulator outlet receptacles 65a, 65b.

The amplifier input receptacle 63a receives a coaxial cable. The coaxial cable sends an unamplified signal from the amplifier input receptacle 63a to a signal amplifier (not shown). The amplified signal is then sent via another coaxial cable connection to the inlet from amplifier receptacle 63b. The inlet from the amplifier receptacle 63b receives the coaxial cable. It is designed such that the amplified signal is sent from the inlet of the amplifier receptacle 63b to a device, preferably a tap, that passes an amplified signal to the amplified cable outlet receptacles 61a–61h of the upper amplified output section 4a which is 6 db higher in gain than the amplified signal sent to the cable outlet receptacles 62a–62h of lower amplified output section 4b. The cable modem outlet receptacle 64 also receives a coaxial cable connection and routes an internet line from the main input receptacle 60 to a user location, hub, or network.

Figure 5:
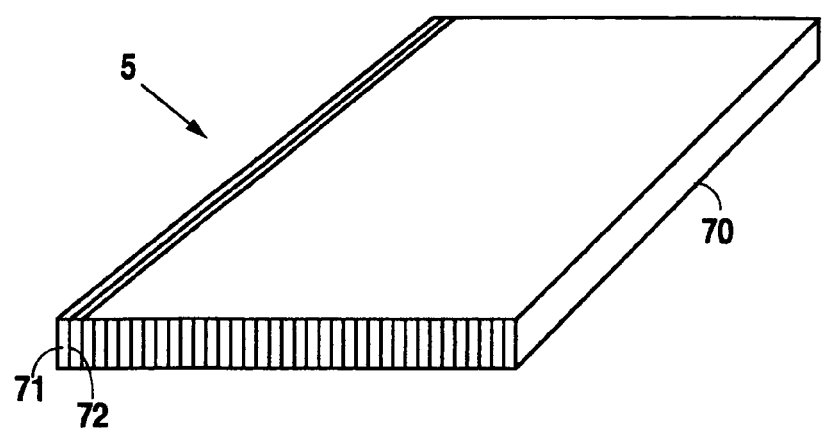
FIGS. 5 and 6 are perspective views illustrating a wire management system.
Figure 6:
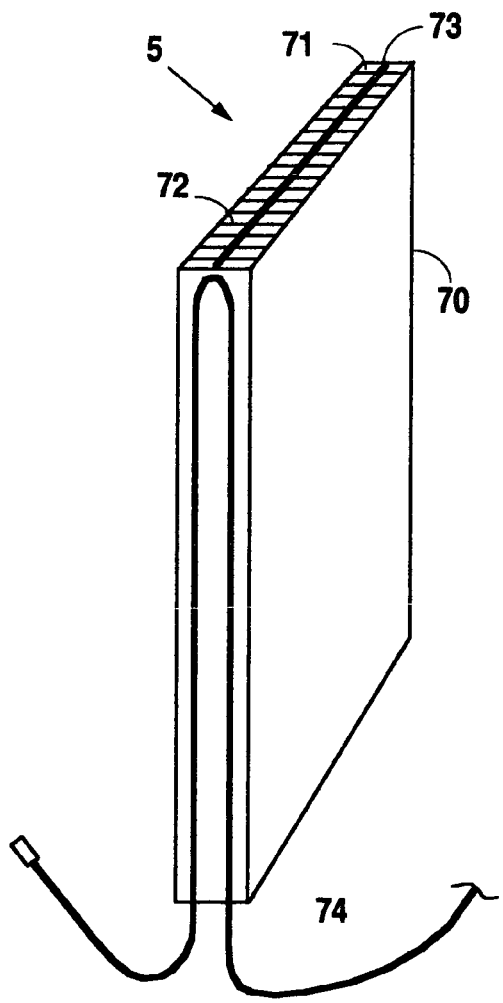

All the various wires routed from the modules described above are sent to user receptacles, networks, or hubs within a structure such as wall-mounted cable outlets, wall socket internet connections, and standard Cat-5 network hubs. The wires are organized by means of a wire management panel 5 and a wire labeling system 6. FIGS. 5 and 6 illustrate the physical characteristics of the wire management panel 5, which includes an outer case 70, a holding strap 73, and parallel veins 71, consisting of the area between parallel spacers 72. In use, a wire 74 originates from a wall receptacle or electronic component (not shown). The wire 74 is then folded over into a loop, and the loop is inserted into one of the parallel veins 71 at the end of the wire management panel 5 opposite the holding strap 73. The loop of wire 74 is sent completely through the parallel vein 71 until stopping at the opposite end of the parallel vein 71. The holding strap 73 prevents the loop from exiting the parallel vein 71. The free end of the wire 74 is then ready to connect to the front panel of one of the various modules of the routing system 7. The loop of wire 74 contained within the wire management panel 5 provides excess wire length that facilitates easier connection to devices or modules.

The connection of the wire 74 to the front panel of a module also facilitates easier testing of that wire or any wire connected to the front panel of a module. One simply disconnects the wire 74 or any other wire from the front panel of a module and tests the line, which eliminates the necessity of accessing the back of the front panel of a module.

The following provides an example of the function and the relationship between the routing system 7 and the wire management panel 5, which is only one of many different ways that the routing system 7 and the wire management panel 5 can be configured.

FIGS. 7, 7a.1 and 7a.2 are shows a master module 1, a 2, 3, 4 module 2, a standard module 3 and a cable module 4. At the top are the wire management panel 5 and a wire labeling system 6. The wire labeling system 6 is a line drawing that includes a destination label section 80, a support structure label section 81, an outlet number label section 82, and an interface label section 83.

In use, an 8-pin, 4-line phone line from a phone service provider is inserted into the main input receptacle 10 on the master module 1. In this example, the four lines from the main input receptacle are all routed to the jumper out receptacles 15a–15c and the lines one through four are routed to the line out receptacles 11a–14a respectively. A security system (not shown) captures line two by receiving line two via the line two out receptacle and returns line two to the system via the line two in receptacle 12b where it can be routed to any user application. The line one out receptacle 11a is "pigtailed" to the line one in receptacle 11b using a standard 2-conductor, 1-line phone connection. Lines 3 and 4 are routed from line out receptacles 13a and 14a to line in receptacles 13b and 14b in the same manner, thus feeding all four lines to the jumper out receptacles 15a–15c. The wire labeling system 5 records the destination of the line one wires using the line drawing as follows. The name of a particular space (e.g., room or other area) or device is recorded in the destination label section 80. The particular location of the support structure (e.g., a wall and the like) supporting an outlet (e.g., cable box, electrical box, and the like) for the line one wires is recorded in the support structure label section 81. An outlet number is recorded in the outlet number label section 82 if there should be more than one outlet on a particular support structure. The type of interface (e.g., cable outlet, electrical outlet, and the like) and the location of the receiving receptacle on the outlet are recorded in the interface identifier label section 83. To accomplish the labeling of the type of interface, the interface identifier label section 83 includes one or more drawings or pictures of a wall outlet or outlets showing one or more jacks. Thus, a mark on the drawing or picture of a wall outlet identifies the type of jack (i.e., a 1, 2, 3, 4, 5, 6, or more jack outlet) as well as the particular jack on the wall outlet associated with the wire or cable being labeled. The interface identifier label section 83 therefore enables fast and easy labeling and makes it possible to identify at a glance a wall outlet and jack corresponding to a desired wire or cable. All four lines are then routed via an 8-conductor, 4-line RJ-45 jumper to both a 2, 3, 4 module 2 via the jumper out receptacle 15c, and a standard module 3 via jumper out receptacle 15b.

The standard module 3 receives the RJ-45 jumper into the main input receptacle 30 and an internet line from an internet service provider into the line two secondary source terminal 39. The jumper pins of the line two jumper pin block 35 are adjusted so as to allow only the internet line to the line two outlet receptacles 31a–31d. The internet line is then routed to user sources via the 8 conductor (cat 5) wire and is made available on the proper pins of the RJ-45 connector in place of the signals that may have been input on the main input receptacle 50. The jumper pin block 36 is configured to allow line three to be routed to both the line three secondary source terminal 40 and the line three outlet receptacles 32a–32d. The line three secondary source terminal 40 is then wired to the line four secondary source terminal 41. This allows the line four jumper pin block 37 to be configured to allow line three to be routed to the line four out receptacles 33a–33c. Now line three can be routed to user sources from the line three outlet receptacles and the line four outlet receptacles via standard 2-conductor, 1-line phone lines and labeled accordingly.

The standard module 3 receives the 8-conductor, 4-line RJ-45 connection from the main module 1 into the main input receptacle 50. All four lines are routed to the line out receptacles 51a–51k. The line out receptacles 51a–51k are designed to route all four lines or any combination of lines from the main input receptacle 50 or the secondary source terminals 56–59 (see FIG. 3).

For cable, the wire labeling system works the same. As an example, the cable module receives a cable line from a cable or internet service provider into the main input receptacle 60. A cable modem hub (not shown) is attached via a coaxial cable to the cable modem outlet receptacle 64 while a signal amplifier is routed into the system via the amplifier outlet receptacle 63*a* and the inlet from amplifier receptacle 63*b*. The amplified signal is then routed to remote televisions via amplified cable outlet receptacles 61*a*–61*h* and labeled accordingly.

Of course, the arrangement and number of modules in the routing system and the arrangement of the wiring in the routing system can be altered for smaller or larger applications. The wire labeling panel can also be altered in size and scope for larger, smaller or even different applications such as stranded fibers, flexible tubes, conduits and the like. Consequently, although the present invention has been described in terms of the foregoing embodiment, such a description had been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description; rather, it is defined only by the claims that follow.

I claim:

1. A module, comprising:
   a main input receptacle adapted to receive a multiple line input; and
   a first jumper pin block connectable to the main input receptacle and adapted to receive a first input signal from a first line of the multiple line input.

2. The module according to claim 1, further comprising a first line out receptacle connectable to the first jumper pin block and adapted to receive the first input signal from the first line of the multiple line input.

3. The module according to claim 2, further comprising a first line in receptacle connectable to the first line out receptacle and adapted to receive the first input signal from the first line of the multiple line input and output the first input signal to a first device.

4. The module according to claim 3, further comprising a second jumper pin block connectable to the main input receptacle and adapted to receive a second input signal from a second line of the multiple line input.

5. The module according to claim 4, further comprising a second line out receptacle connectable to the second jumper pin block and adapted to receive the second input signal from the second line of the multiple line input.

6. The module according to claim 5, further comprising a second line in receptacle connectable to the second line out receptacle and adapted to receive the second input signal from the second line of the multiple line input and output the second input signal to a second device.

7. The module according to claim 6, wherein the first line in receptacle is connectable to the second line out receptacle and adapted to receive the second input signal from the second line of the multiple line input and output the second input signal to the first device.

8. The module according to claim 6, wherein the second line in receptacle is connectable to the first line out receptacle and adapted to receive the first input signal from the first line of the multiple line input and output the first input signal to the second device.

9. The module according to claim 4, further comprising a jumper out receptacle connectable to the first jumper pin block and the second jumper pin block and adapted to receive the first input signal from the first line of the multiple line input and the second input signal from the second line of the multiple line input.

10. The module according to claim 5, wherein the first line out receptacle and the second line out receptacle are connectable to a testing device.

11. The module according to claim 5, wherein the first line out receptacle and the second line out receptacle are connectable to a system.

12. The module according to claim 11, wherein a return line of the system is connectable to the first line in receptacle.

13. The module according to claim 11, wherein a return line of the system is connectable to the second line in receptacle.

14. The module according to claim 1, further comprising a secondary source terminal adapted to receive a secondary source input.

15. The module according to claim 14, wherein the first jumper pin block is connectable to the secondary source terminal and adapted to receive a secondary input signal from the secondary source terminal.

16. The module according to claim 4, further comprising a secondary source terminal adapted to receive a secondary source input.

17. The module according to claim 16, wherein the second jumper pin block is connectable to the secondary source terminal and adapted to receive a secondary input signal from the secondary source terminal.

18. A wire management panel, comprising:
    an outer case;
    a plurality of spacers housed within the outer case, said plurality of spacers defining a plurality of veins each adapted to receive a loop of wire therein, and
    a strap secured to the outer case at one end thereof to prevent the protrusion of each loop of wire from the outer case.

19. The apparatus for routing a wiring system, comprising a master module adapted to receive a connection from at least one communication service provider and output signals received from the communication service provider to any one of or all of a 2, 3, 4 module, a standard module, and end user devices.

20. The apparatus for routing a wiring system according to claim 19, the master module, comprising:
    a main router section, comprising:
    a main input receptacle adapted to receive a connection from the communication service provider, and
    a line out section adapted to receive output line connections; and
    a panel router section, comprising:
    one or more jumper pin blocks that connect to the main input receptacle and direct one or more incoming lines from the communication service provider to the line out section.

21. The apparatus for routing and mapping a wiring system according to claim 20, the main router section, further comprising a line in section adapted to receive input line connections from the line out section.

22. The apparatus for routing a wiring system according to claim 20, the main router section, further comprising a jumper out receptacle adapted to receive from the one or more jumper pin blocks all the incoming lines from the communication service provider.

23. The apparatus for routing a wiring system according to claim 19, the master module, comprising:
a main router section, comprising:
a line out section adapted to receive output line connections; and
a panel router section, comprising:
a secondary input section adapted to receive one or more connections from an alternate communication source; and
one or more jumper pin blocks that connect to the secondary input section and direct one or more incoming lines from the alternate communication sources to the line out section.

24. The apparatus for routing a wiring system according to claim 23, the main router section, further comprising a line in section adapted to receive input line connections from the line out section.

25. An apparatus for routing a wiring system, comprising a 2,3,4 module adapted to receive a multiple line input connection from at least one communication service provider, wherein the 2,3,4 module switches the order of output for signals received from the communication service provider through the multiple line input connection prior to outputting the signals to end user devices.

26. The apparatus for routing a wiring system according to claim 25, the 2, 3, 4 module, comprising:
a main router section, comprising:
a main input receptacle adapted to receive a connection from the communication service provider, and
a line out section adapted to receive output line connections; and
a panel router section, comprising:
one or more jumper pin blocks that connect to the main input receptacle and direct one or more incoming lines from the communication service provider to the line out section.

27. The apparatus for routing a wiring system according to claim 26, the main router section, further comprising a line in section adapted to receive input line connections from the line out section.

28. The apparatus for routing a wiring system according to claim 25, the 2, 3, 4 module, comprising:
a main router section, comprising:
a line out section adapted to receive output line connections; and
a panel router section, comprising:
a secondary input section adapted to receive one or more connections from an alternate communication source; and
one or more jumper pin blocks that connect to the secondary input section and direct one or more incoming lines from the alternate communication sources to the line out section.

29. The apparatus for routing a wiring system according to claim 28, the main router section, further comprising a line in section adapted to receive input line connections from the line out section.

30. The apparatus for routing a wiring system according to claim 19, wherein the standard module is adapted to receive a connection from at least one communication service provider and output signals received from the communication service provider to end user devices.

31. The apparatus for routing a wiring system according to claim 30, the standard module, comprising:
a main input receptacle adapted to receive a connection from the communication service provider, and
a line out section adapted to receive from the main input receptacle all the incoming lines from the communication service provider.

32. The apparatus for routing a wiring system according to claim 30, the standard module, comprising:
a main router section, comprising:
a line out section adapted to receive output line connections; and
a panel router section, comprising:
a secondary input section adapted to receive one or more connections from an alternate communication source; and
one or more jumper pin blocks that connect to the secondary input section and direct one or more incoming lines from the alternate communication sources to the line out section.

33. A module, comprising:
a secondary source terminal adapted to receive a secondary source input; and
a jumper pin block connectable to the secondary source terminal and adapted to receive a secondary input signal from the secondary source terminal.

34. The module according to claim 33, further comprising a line out receptacle connectable to the jumper pin block and adapted to receive the secondary input signal from the secondary source input.

35. The module according to claim 34, further comprising a line in receptacle connectable to the line out receptacle and adapted to receive the secondary input signal from the secondary source input and output the secondary input signal to a device.

36. The module according to claim 33, further comprising a jumper out receptacle connectable to the jumper pin block and adapted to receive the secondary input signal from the secondary source input.

37. The module according to claim 34, wherein the line out receptacle is connectable to a testing device.

38. The module according to claim 35, wherein the line out receptacle is connectable to a system and a return line of the system is connectable to the line in receptacle.

39. The apparatus for routing a wiring system according to claim 25, the 2,3,4 module, comprising:
a main router section, comprising:
a main input receptacle adapted to receive a multiple line input connection from the communication service provider, and
a line out section adapted to switch the order of output for signals received from the communication service provider through the multiple line input connection prior to outputting the signals to end user devices.

40. The apparatus for routing a wiring system according to claim 25, the 2,3,4 module, comprising:
a main router section, comprising:
a main input receptacle adapted to receive a 1,2,3,4 line input connection from the communication service provider, and
a line out secction adapted to switch the order of outpur for signals received from the 1,2,3,4 line input connection to one of a 2,3,4,1 output, a 3,4,1,2 output, and a 3,1,2,3 outpput prior to outputting the signals to end user devices.

* * * * *